JUNCTION-TYPE TRANSISTORS
Filed Dec. 23, 1952
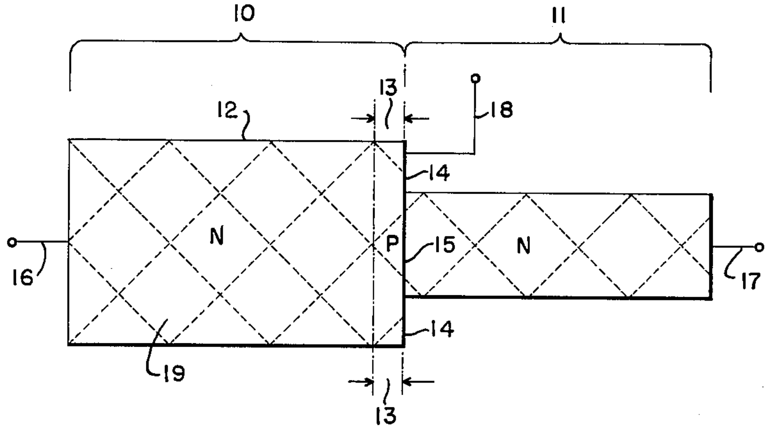
INVENTORS
RONALD W. DOUGLAS
JOHN W. RYDE
BY Laurence B. Dodds
ATTORNEY United States Patent Office 2,736,849

Patented Feb. 28, 1956

2,736,849

JUNCTION-TYPE TRANSISTORS

Ronald W. Douglas and John W. Ryde, Wembley, England, assignors to Hazeltine Research, Inc., Chicago, Ill., a corporation of Illinois Application December 23, 1952, Serial No. 327,482

Claims priority, application Great Britain December 31, 1951

6 Claims. (Cl. 317—235)

This invention relates to junction-type transistors.

It is known that in slightly impure semiconductive materials of the type employed in transistors, for example germanium including minute impurities, there may be two types of carriers of electricity or electrical charges which differ in sign. The type of carrier present is determined by the type of impurity in the semiconductive material and determines the type of conductivity of the semiconductive material. For example, in germanium, when it exhibits negative conductivity, such germanium being conventionally designated as N-type germanium, the negative carriers are electrons which carry negative charges and which are contributed by an impurity such an antimony. These electrons are free to move through the crystalline structure of the germanium and, thus, cause a flow of electricity in the form of a negative electrical current if the proper potentials are applied across the germanium. If the germanium exhibits positive conductivity and, thus, is a class of germanium conventionally designated as P type, there is an excess of positive charged carriers present in the germanium. The positive carriers may result from the addition to the germanium of an impurity such as indium, causing a net positive charge to be present in those germanium atoms coupled with an indium atom. These net positive charges are termed "holes" and germanium including such "holes" exhibits a flow of current therethrough determined by the motion of the "holes" when the proper potentials are applied thereacross. It is possible that impurities of both types may be present in any semiconductor and the conductivity of the semiconductor is then determined by the type of impurity in excess and somewhat by the degree to which such impurity is in excess.

There has recently been developed an electrical discharge device which utilizes these different conductivity properties of semiconductors. This device is known as a transistor and one form thereof, known as a junction-type transistor, consists of a thin layer of germanium of one conductivity sandwiched between two members of germanium of similar conductivity opposite that of the thin layer. Electrical connections are made to each of the members and to the thin layer to form the complete junction-type transistor. A transistor of this type comprises germanium divided into three regions. In one such transistor, the thin layer may be of N-type germanium with the sandwiching members of P-type germanium so that two P–N junctions are formed at the interfaces of the P and N regions. One method of manufacturing the body of semiconductive material for such a transistor is slowly to cause an elongated crystal of germanium to be grown out of liquid germanium by causing a crystal seed properly oriented to touch the surface of the liquid and then slowly withdrawing it from this surface. The withdrawing process permits the natural cohesion of the germanium atoms to form an elongated solid as the initial crystal cell or group of cells applied to the surface of the molten germanium is slowly withdrawn from the surface thereof. To develop the P–N junctions as described above for a transistor having a thin layer of N-type semiconductor between two P-type semiconductor members, thus forming a junction transistor commonly known as P–N–P type, sufficient indium may first be added as an impurity to substantially pure liquid germanium to cause the first portion of the crystal withdrawn from the molten germanium to have P-type conductivity. Then, to provide the N-type conductivity layer in the crystal, antimony may be added to the liquid germanium in an amount to exceed all other impurities in the germanium to convert it to N-type germanium and, thus, permit the addition of the N-type layer to the previously formed P-type member. After an N-type layer of desired thickness is formed, indium in excess of all other impurities present may be added to the liquid germanium to reconvert it to P-type germanium permitting the second member of P-type germanium to be formed on the elongated crystal. It is possible in this way to develop a P–N–P type of junction transistor and by analogous methods to form N–P–N or any other desired type of junction transistor.

It is apparent that the continual adding of the impurities such as antimony and indium to the liquid germanium will gradually cause the liquid to become so impure as to become unusable without purification thereof. For the latter reason, the process described is undesirably inefficient, it being preferable that the germanium be purified only once and all such purified germanium be utilized without need for further purification to provide as much N-type or P-type germanium as is desired.

There is a further deficiency in the process just described. As the elongated P–N–P germanium crystal is formed, the cross-sectional area of sections from one end to the other thereof remains substantially constant. Since the N-type layer sandwiched between the P-type members is usually of the order of 0.0004 of an inch in thickness, it becomes difficult to connect a wire thereto to provide means for electrical connection thereto.

Accordingly, it is an object of the present invention to provide a new and improved junction-type transistor.

It is a further object of the present invention to provide a new and improved junction-type transistor in which electrical connection may be simply and securely made to the thin portion of the transistor sandwiched between the end members thereof.

In accordance with the present invention, a junction-type transistor comprises a body of semiconductive material including two members. One of these members has an electrical conductivity of one type in one zone thereof and an electrical conductivity of another type in another zone thereof and has a predetermined surface. The other member has an electrical conductivity of the aforesaid one type and a surface having an area less than that of the predetermined surface. The surface of the other member is heat and pressure bonded to the surface of the one member so that the interface of the bonded surfaces of the members has an area less than that of the predetermined surface. The transistor also comprises means for making an electrical connection to each of the members and for making an electrical connection to one of the surfaces.

For a better understanding of the present invention, together with other and further objects thereof, reference is had to the following description taken in connection with the accompanying drawing, and its scope will be pointed out in the appended claims.

The drawing is a diagrammatic representation of one type of N–P–N junction-type transistor formed in accordance with the present invention.

*Description of junction-type transistor*

The junction-type transistor represented in the drawing comprises a body of semiconductive material having two members 10 and 11. The semiconductive material may be of a conventional type, for example, germanium of crystalline structure having crystal cells such as cell 19. The member 10 has one zone 12 having an electrical conductivity of one type, specifically, of N type, and another zone 13 having P-type electrical conductivity. The zone 12 has a predetermined minimum dimension, specifically the thickness dimension measured parallel to the junction between the zones 12 and 13, and the zone 13 has a dimension less than this predetermined dimension, specifically that dimension between the junction of the zones 12 and 13 and a planar surface 14. The member 11 has an electrical conductivity of N type and a planar surface 15 having an area less than that of the surface 14. The surface 15 is bonded to a portion of the surface 14, for example, as will be explained more fully hereinafter. These surfaces may be fused together or caused to adhere at temperatures less than fusion. In view of the smaller area of the surface 15, a portion of the surface 14 is not in contact with the surface 15 and is, therefore, exposed. In other words, the interface of the bonded surfaces has an area less than that of the surface 14. This exposed surface has area dimensions greater than the thickness dimension considered with respect to the zone 13.

The transistor also comprises means for making an electrical connection to each of the members 10 and 11, specifically, conductors 16 and 17 physically connected to the members 10 and 11, respectively, and for quickly and easily making a simple type of electrical connection to one of the aforementioned planar surfaces, specifically, an electrical conductor 18 connected to the surface 14. Though the transistor has the electrical characteristics of an N–P–N type junction transistor, if desired a P–N–P type of junction transistor may be prepared in accordance with the teaching of the present invention.

The body of semiconductive material of the transistor may be produced by forming on the member 10 thereof, which initially has N type of electrical conductivity throughout, the layer 13 of semiconductive material which has P-type conductivity. The N type of germanium may be formed by a number of processes, for example, by the process previously described herein, wherein molten germanium is converted to N-type germanium by adding the impurity antimony thereto. An elongated crystal of N type may be withdrawn from this molten germanium as previously described herein and cut into multiple sections such as the one represented by the member 10. The P-type layer 13 may be formed on one end of the N-type member 10 by causing this end to become plastic by heating to approximately 800° C. and by then applying indium in excess of all other impurities present to diffuse into the N-type germanium to convert it to P-type germanium for the thickness of the layer 13. The amount of indium and the processing time are controlled so that the thickness of the layer 13 is of the order of $10^{-3}$ centimeters. The N-type member 11 may be obtained from the elongated crystal described with reference to the preparation of the member 10 by causing the diameter of a part thereof to be diminished by a milling or similar operation. In the manufacturing process, the N-type member 11 is disposed so that the planar surface 15 thereof is in contact with the planar surface 14 of the layer 13. While in this position, these surfaces are heated in an inert atmosphere, for example, in a vacuum to a temperature of approximately 800° C. thereby causing at least one of the surfaces to become adhesive. The surfaces are pressed together to cause them to adhere to each other and are then cooled below the aforesaid temperature to form the complete body of semiconductive material. To ensure good adhesion of the surfaces 14 and 15, it is desirable that these surfaces should geometrically conform as accurately as possible to each other. In order to decrease the number of steps in the process, it is also possible to combine the heating process of the N-type member 10 to convert the conductivity of one end thereof as previously described to the P-type conductivity and the pressing of the surfaces 15 and 14 together to form the complete body of semiconductive material.

After the body of semiconductive material is formed, the conductors 16, 17, and 18 are physically connected to the members 10 and 11 and the surface 14, respectively, by well-known means, some of which will now be discussed. For example, these conductors may be connected to the appropriate surfaces to form ohmic connections rather than rectifying connections by coating part of each exposed surface with metal and then securing a conductor to the metal coating. Such coating may conveniently be provided by plating, painting with metal paint, or evaporation of a liquid including metal after the liquid is applied to the surface. Alternatively, a small portion of germanium of the proper conductivity type may be prepared with a conductor connected thereto and then the germanium may be heated to a plastic state and applied to the appropriate surface of the semiconductive material.

The juncture type of transistor described herein may be either P–N–P or N–P–N or a more complex type and is manufactured by a simple process essentially requiring only the manufacture of elongated cylinders of a semiconductor of one type, either P or N type. The need for manufacturing semiconductor crystals of only one type simplifies and makes more efficient the preparation of the bodies of semiconductor material. The thin layer of other conductivity type formed on the members of the semiconductive body is then obtainable by heating the ends of such members until plastic and diffusing through such ends the proper impurity to obtain zones thereon which have conductivities of a type opposite that of the larger unaffected zone of the member. These treated ends are then pressed together to form the complete semiconductor. A transistor in accordance with the present invention has another desirable feature in that the conductor for making an electrical connection to the thin layer need not be connected to such layer at a point limited by the thickness thereof but is simply and easily connected to a surface of such layer having a dimension much greater than the thickness.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A junction-type transistor comprising: a body of semiconductive material including two members, one thereof having an electrical conductivity of one type in one zone thereof and an electrical conductivity of another type in another zone thereof and having a predetermined surface, and the other member having an electrical conductivity of said one type and a surface having an area less than that of said predetermined surface, said surface of said other member being heat and pressure bonded to said surface of said one member so that the interface of said surfaces has an area less than that of said predetermined surface; and means for making an electrical connection to each of said members and for making an electrical connection to said predetermined surface.

2. A junction-type transistor comprising: a body of germanium including two members, one thereof having an electrical conductivity of one type in one zone thereof and an electrical conductivity of another type in another zone thereof and having a predetermined surface, and the other member having an electrical conductivity of said one type and a surface having an area less than that of said predetermined surface, said surface of said other member being heat and pressure bonded to said surface of said one member so that the interface of said surfaces has an area less than that of said predetermined surface; and means for making an electrical connection to each of said members and for making an electrical connection to said predetermined surface.

3. A junction-type transistor comprising: a body of semiconductive material including two members, one thereof having N-type electrical conductivity in one zone thereof and P-type electrical conductivity in another zone thereof said other zone having a predetermined surface, and the other member having N-type electrical conductivity and a surface having an area less than that of said predetermined surface, said surface of said other member being heat and pressure bonded to said surface of said one member so that the interface of said surfaces has an area less than that of said predetermined surface; and means for making an electrical connection to each of said members and for making an electrical connection to predetermined said surface.

4. A junction-type transistor comprising: a body of semiconductive material including two members, one thereof having an electrical conductivity of one type in one zone thereof and an electrical conductivity of another type in another zone thereof and having a predetermined surface, and the other member having an electrical conductivity of said one type and a surface having an area less than that of said predetermined surface, said surface of said other member being heat and pressure bonded to said surface of said one member so that the interface of said surfaces has an area less than that of said predetermined surface; and means for making an electrical connection to each of said members and for making an electrical connection to said surface of said one member.

5. A junction-type transistor comprising: a body of semiconductive material including two members, one thereof having an electrical conductivity of one type in one zone thereof and an electrical conductivity of another type in another zone thereof and having a predetermined surface, and the other member having an electrical conductivity of said one type and a surface having an area less than that of said predetermined surface, said surface of said other member being heat and pressure bonded to said surface of said one member so that the interface of said surfaces has an area less than that of said predetermined surface; and means for making an electrical connection to each of said members and for making an electrical connection to the exposed portion of said surface of said one member.

6. A junction-type transistor comprising: a body of semiconductive material including two members, one thereof having an electrical conductivity of one type in one zone thereof having a predetermined minimum dimension and an electrical conductivity of another type in another zone thereof having a dimension less than said predetermined dimension and having a predetermined surface, and the other member having an electrical conductivity of said one type and a surface having an area less than that of said predetermined surface, said surface of said other member being fused to said surface of said one member so that the interface of said surfaces has an area less than that of said predetermined surface and the exposed portion of said surface of said one member having dimensions greater than said dimension of said other zone; and means for making an electrical connection to each of said members and for making an electrical connection to said exposed portion of said surface of said one member.

References Cited in the file of this patent

UNITED STATES PATENTS

| | | |
|---|---|---|
| 2,502,479 | Pearson et al. | Apr. 4, 1950 |
| 2,560,594 | Pearson | July 17, 1951 |
| 2,561,411 | Pfann | July 24, 1951 |
| 2,623,102 | Shockley | Dec. 23, 1952 |
| 2,651,009 | Meyer | Sept. 1, 1953 |
| 2,701,326 | Pfann | Feb. 1, 1955 |